(12) United States Patent
Shin et al.

(10) Patent No.: US 10,740,060 B2
(45) Date of Patent: Aug. 11, 2020

(54) METHOD AND DEVICE FOR CONTROLLING MIRRORING SERVICES

(71) Applicant: SAMSUNG ELECTRONICS CO., LTD., Suwon-si (KR)

(72) Inventors: In-Young Shin, Seoul (KR); Se-Hee Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/126,176

(22) PCT Filed: Mar. 16, 2015

(86) PCT No.: PCT/KR2015/002526
§ 371 (c)(1),
(2) Date: Sep. 14, 2016

(87) PCT Pub. No.: WO2015/137784
PCT Pub. Date: Sep. 17, 2015

(65) Prior Publication Data
US 2017/0083275 A1 Mar. 23, 2017

(30) Foreign Application Priority Data
Mar. 14, 2014 (KR) .......................... 10-2014-0030654

(51) Int. Cl.
*G06F 3/14* (2006.01)
*G09G 5/12* (2006.01)

(52) U.S. Cl.
CPC ............ *G06F 3/1454* (2013.01); *G09G 5/12* (2013.01); *G09G 2370/16* (2013.01)

(58) Field of Classification Search
CPC .................................. G06F 3/1454; G09G 5/12
See application file for complete search history.

(56) References Cited

U.S. PATENT DOCUMENTS 6,467,034 B1 10/2002 Yanaka
2004/0021642 A1* 2/2004 Cheng ................... G06F 1/3203
345/173

(Continued)

FOREIGN PATENT DOCUMENTS

KR 10-2010-0019669 A 2/2010
KR 10-1179912 B1 9/2012

(Continued)

OTHER PUBLICATIONS

Search Report dated May 19, 2015, issued by the International Searching Authority in counterpart International Application No. PCT/KR2015/002526 (PCT/ISA/210, PCT/ISA/220).

(Continued)

*Primary Examiner* — Alexander Eisen
*Assistant Examiner* — Cory A Almeida
(74) *Attorney, Agent, or Firm* — Sughrue Mion, PLLC

(57) ABSTRACT

The present disclosure relates to a pre-5th-Generation (5G) or 5G communication system to be provided for supporting higher data rates Beyond 4th-Generation (4G) communication system such as Long Term Evolution (LTE).

A method by which a master device provided by one embodiment of the present invention controls mirroring services between the master device and a slave device comprises the steps of: storing information related to first connection mode mirroring when a termination event of mirroring connected in a first connection mode has occurred; and setting mirroring in a second connection mode by using the stored mirroring-related information.

4 Claims, 3 Drawing Sheets

(56) References Cited

U.S. PATENT DOCUMENTS

| | | | |
|---|---|---|---|
| 2006/0050018 A1* | 3/2006 | Hutzel | B60K 35/00 345/60 |
| 2007/0168518 A1* | 7/2007 | McCabe | G06F 11/2058 709/226 |
| 2011/0257973 A1* | 10/2011 | Chutorash | G01C 21/3661 704/235 |
| 2013/0143496 A1 | 6/2013 | Lee | |
| 2014/0055344 A1 | 2/2014 | Seo et al. | |
| 2014/0277843 A1* | 9/2014 | Langlois | H04M 1/6091 701/2 |

FOREIGN PATENT DOCUMENTS

| | | |
|---|---|---|
| KR | 10-2013-0101801 A | 9/2013 |
| KR | 10-2013-0134392 A | 12/2013 |

OTHER PUBLICATIONS

Written Opinion dated May 19, 2015, issued by the International Searching Authority in counterpart International Application No. PCT/KR2015/002526 (PCT/ISA/237).

* cited by examiner

METHOD AND DEVICE FOR CONTROLLING MIRRORING SERVICES

PRIORITY

This application is a National Phase Entry of PCT International Application No. PCT/KR2015/002526, which was filed on Mar. 16, 2015, and claims a priority to Korean Patent Application 10-2014-0030654, which was filed on Mar. 14, 2014, the contents of which are incorporated herein by reference.

BACKGROUND

1. Field of the Disclosure

The present disclosure relates to a method and device for providing mirroring services between different devices.

2. Description of the Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, as mobile devices such as smartphones, tablet personal computers (PCs), and so forth have come into popular use, they substitute for functions of navigation systems, digital cameras, and the like.

However, current mobile devices, because of having size limitations of displays, cause inconvenience in service usage due to small sizes of the displays. To solve the problem, a new technology "mirroring" has emerged. The mirroring technology enables a screen of a mobile device such as a smartphone to be displayed on another display literally like a mirror. Users then may see the screen of the mobile device having a small-size display on another device having a larger-size display, such that user satisfaction with a service provided on the mobile device may be improved. However, in a broader sense, mirroring refers to a technology for displaying a screen of a first device through a second device wirelessly or wiredly connected to the first device.

The basic concept of the mirroring technology connects a mobile device to another display ad delivers a screen of the mobile device to the another display. For mirroring, different devices need to be connected, and there are various mirroring schemes such as wired connection mirroring and wired connection mirroring depending on various connection modes.

SUMMARY

An embodiment of the present disclosure provides a method and device for seamlessly providing a mirroring service in a mirroring mode operating in different connection modes.

According to an aspect of the present disclosure, there is provided a method by which a master device provided by one embodiment of the present invention controls mirroring services between the master device and a slave device, the method including storing information related to first connection mode mirroring when a termination event of mirroring connected in a first connection mode has occurred, and setting mirroring in a second connection mode by using the stored mirroring-related information.

According to another aspect of the present disclosure, there is provided a device for controlling a mirroring service between a master device and a slave device, the device including a storing unit configured to store information related to first connection mode mirroring when a termination event of mirroring connected in the first connection mode has occurred, and a controller configured to set mirroring in a second connection mode by using the stored mirroring-related information.

DETAILED DESCRIPTION OF EMBODIMENTS OF THE PRESENT DISCLOSURE

In the following description of the present disclosure, a detailed description of well-known functions or elements associated with the present disclosure will be omitted if it unnecessarily obscures the subject matter of the present disclosure. Hereinafter, embodiments will be described with reference to the accompanying drawings.

The following embodiments will be separately described for convenience, but at least two embodiments may be implemented in combination without colliding with each other.

Embodiments of the present disclosure are intended to seamlessly provide a mirroring service if a connection mode of the mirroring service is changed. A representative example of the connection mode may be a wired connection mode or a wireless connection mode. Prior to a description of an embodiment of the present disclosure, wired connection mirroring and wireless connection mirroring will be described in brief.

Figure 1:
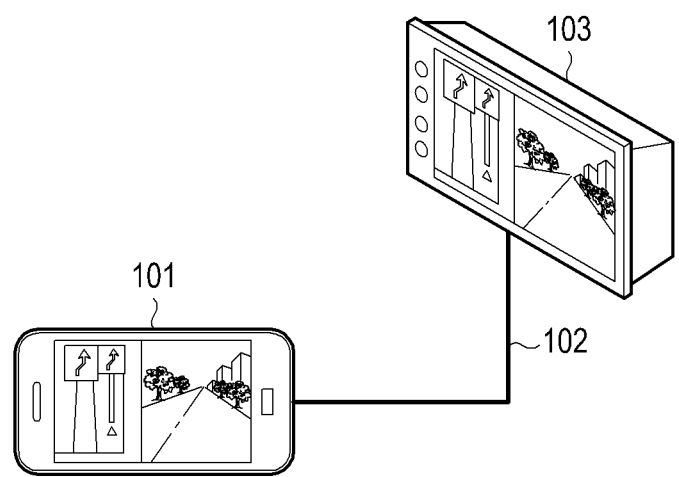
FIG. 1 is a view for describing wired connection mirroring according to an embodiment of the present disclosure.

FIG. 1 is a view for describing wired connection mirroring according to an embodiment of the present disclosure.

A mobile terminal 101 is connected with an external device 103 through wired connection 102. In FIG. 1, a user is operating a particular application, e.g., a navigation application, which is displayed in the external device 103 based on a mirroring service through the wired connection 102. Depending on circumstances, displaying of a screen of the mobile terminal 101 in the external device 103 through the wired connection 102 may be referred to as a term other than "mirroring", but in an embodiment of the present disclosure, displaying of the screen of the mobile terminal 101 in the external device 103 will also be referred to as (wired) "mirroring".

Figure 2:
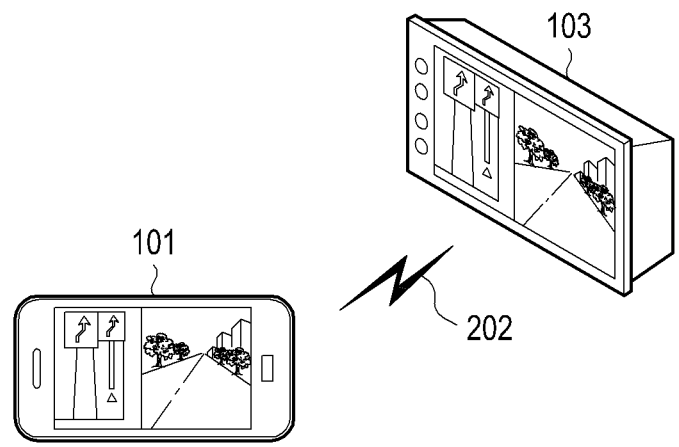
FIG. 2 is a view for describing wireless connection mirroring according to an embodiment of the present disclosure.

FIG. 2 is a view for describing wireless connection mirroring according to an embodiment of the present disclosure.

In FIG. 2, the screen of the mobile terminal 101 is displayed on the external device 103 through wireless connection 202. That is, a situation is the same as the situation as described with reference to FIG. 1 except that mirroring is performed by the wireless connection 202.

Cross-switch between wired connection mirroring and wireless connection mirroring may often occur especially when mirroring is performed in a driving vehicle.

First, a wired connection cable may have to be separated from the mobile terminal 101 during performing of the wired connection mirroring. For example, since a driver in a driver's seat of a driving vehicle cannot receive a voice call through the mobile terminal 101 during execution of a navigation application through wired connection mirroring, a fellow passenger in a rear passenger seat may desire to receive the voice call. In this case, if a length of a wired cable for wired connection is short, the wired cable needs to be separated from the mobile terminal 101 for voice communication. If the wired cable is separated in wired connection mirroring, existing wired connection mirroring is terminated. Thus, the driver may have to continue driving without using the navigation application.

On the other hand, wireless connection in wireless connection mirroring may be released and then wired connection may be made. For example, if the navigation application is executed through wireless connection mirroring during driving, the wired cable may have to be frequently connected to the mobile terminal 101 to charge a battery of the mobile terminal 101 because of much consumption of the battery. Existing wireless connection mirroring may be terminated due to connection of the wired cable during the wireless connection mirroring. Thus, the driver may have to continue driving without using the navigation application.

An embodiment of the present disclosure provides a scheme for enabling seamless mirroring even if wired connection is released during wired connection mirroring or wired connection is made during wireless connection mirroring. Although the external device 103 has been described above as a display existing in a vehicle, this description is intended for convenience, such that the external device 103 does not have to be a display in a vehicle and may be any device that is separated from the mobile terminal 101. Moreover, while a wired mode and a wireless mode have been described as examples of a mirroring mode in an embodiment of the present disclosure, this description is merely an example, such that an embodiment of the present disclosure may be applicable to any mirroring mode if switch between different mirroring modes is possible.

Figure 3:
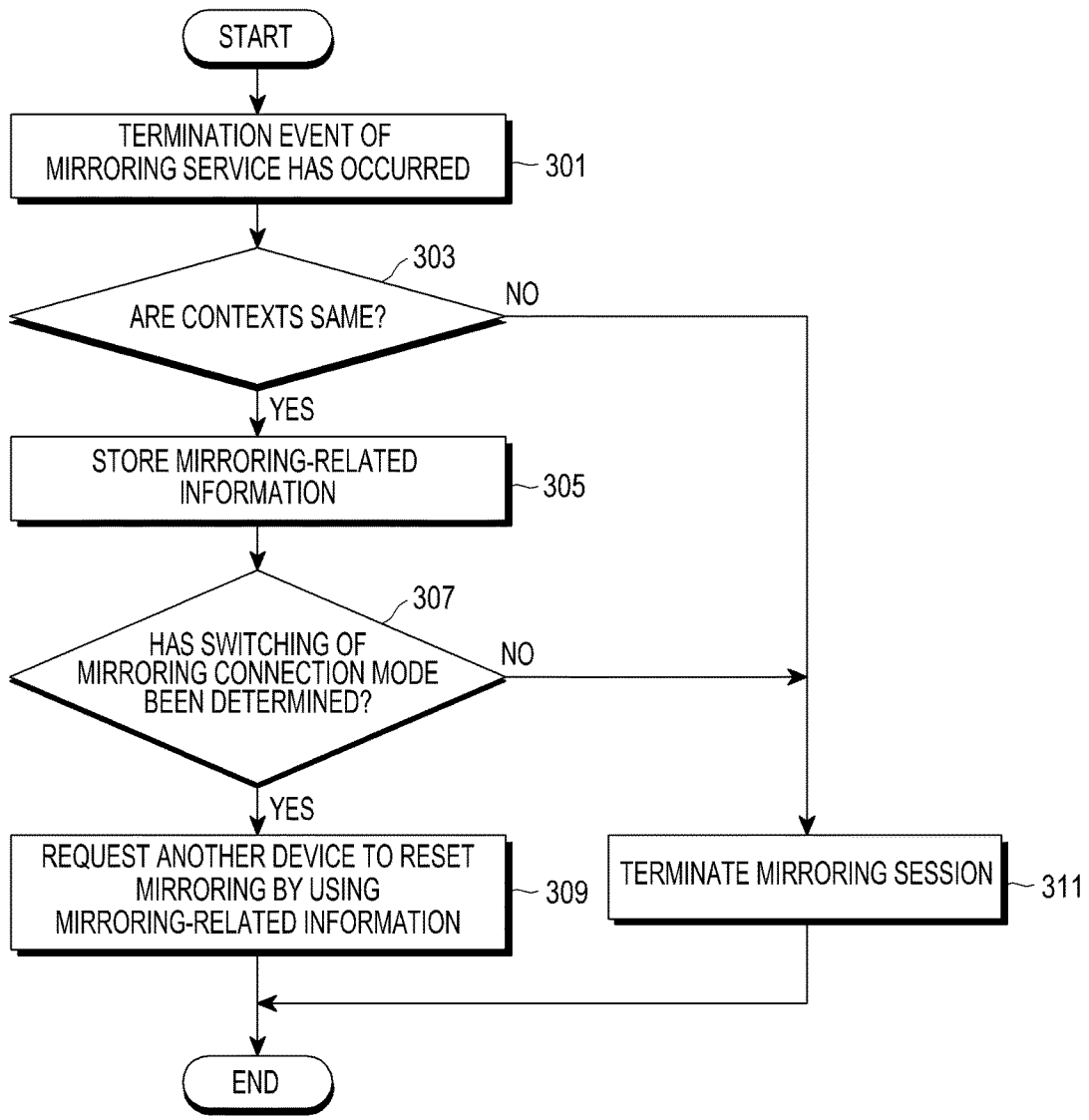
FIG. 3 is a flowchart of operations for seamless mirroring in mirroring switching between mirroring modes according to an embodiment of the present disclosure.

FIG. 3 is a flowchart of operations for seamless mirroring in mirroring switching between mirroring modes according to an embodiment of the present disclosure.

For reference, operations illustrated in FIG. 3 may be performed by a device operating as a master device between two interconnected mirroring devices. That is, if the mobile terminal 101 and the external device 103 are mirroring-connected, each of them may be a master device. Whether a device is a master device or a slave device may be determined depending on presetting or user's setting. For example, when the mobile terminal 101 and the external device 103 are mirroring-connected in a vehicle, the external device 103 may be a device in the vehicle, such that the external device 103 in the vehicle may be a master device and the mobile terminal 101 may be a slave device according to presetting. However, this configuration may be changed by the user's controlling the device 103 or the mobile terminal 101 in the vehicle.

It is assumed that a termination event of a mirroring service has occurred in operation 301. Herein, the "termination event of the mirroring service" may corresponding to a case where the wired cable is separated in wired mode mirroring or the wired cable is connected in wireless mode mirroring in the above-described example. That is, any situation where a current mirroring service may be discontinued may correspond to the termination event of the mirroring service.

In operation 303, it is determined whether a context before occurrence of the termination event of the mirroring service and a context after occurrence of the termination event of the mirroring service are the same as each other. An example of the context may be whether traveling of the vehicle continues before and after occurrence of the termination event of the mirroring service, if the external device 103 in the vehicle is a master device.

That is, it is determined whether the context after event occurrence is the same as the context before event occurrence, and if not, a connected mirroring session is completely terminated in operation 311. If the vehicle does not run or the mobile terminal 101 is not situated in the vehicle after the wired cable is separated from the mobile terminal 101 in the wired mirroring in the foregoing example, then it means the contexts are not the same as each other. Thus, it this case, an existing mirroring session is completely terminated because mirroring connection is not needed any longer.

On the other hand, if the context after event occurrence is the same as the context before event occurrence, an operation for mirroring mode switching is performed in operation 305. In operation 305, the master device stores mirroring-related information related to previously connected mirroring. The mirroring-related information includes at least one of session information related to connection setting of previously connected mirroring, codec information of a connected counterpart (slave) device, connection device information such as CPU information, a service that is being mirrored, and mirroring service information such as application information.

In operation 307, it is determined whether mirroring connection mode switching is to be performed with the previously connected slave device.

For example, it is assumed that the external device 103 operates as a master device. In this case, when a navigation application previously operating in the mobile terminal 101 continuously operates if the external device 103 is wirelessly connected with the mobile terminal 101 after the wired cable is separated in wired connection mirroring, wireless connection mirroring needs to be performed, such that the external device 103 determines mirroring connection mode switching. If the operation of the navigation application previously operating in the wirelessly connected mobile terminal 101 is terminated, mirroring does not need to be performed anymore and thus switching to wireless connection mirroring is not needed. Thus, in this case, the mirroring session is terminated in operation 311.

On the other hand, it will be assumed that the mobile terminal 101 serves as a master device. In this case, after the wired cable is separated in wired connection mirroring, the mobile terminal 101 determines whether the navigation application previously operating in the mobile terminal 101 operates, so as to determine whether to switch to wireless connection mirroring.

If switching of the mirroring connection mode is determined in operation 307, operation 309 is performed. In operation 309, the previously connected counterpart (slave) device is requested to reset mirroring in a connection mode by using the mirroring-related information stored in operation 305, and performs mirroring in the connection mode.

Figure 4:
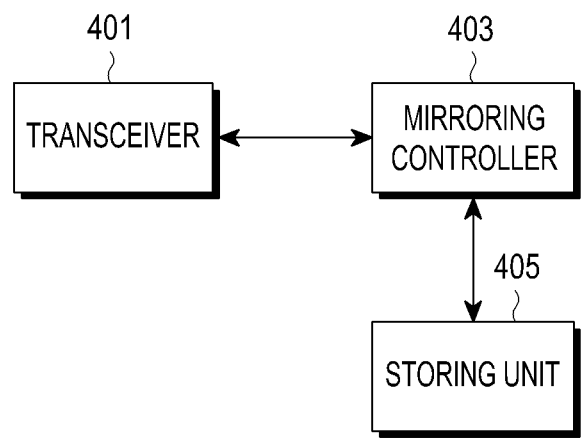
FIG. 4 is a block diagram of a switching device for mirroring switching according to an embodiment of the present disclosure.

FIG. 4 is a block diagram of a switching device for mirroring switching according to an embodiment of the present disclosure.

The mirroring switching device shown in FIG. 4 is included in a master device among devices connected for mirroring. Thus, in the above example, the mirroring switching device may be included in the external device 103 or the mobile terminal 101 situated in the vehicle.

More specifically, a transceiver 401 may be connected wiredly or wirelessly with a counterpart (slave) device and transmit or receive mirroring-related information and mirroring images to and from the counterpart device.

A mirroring controller 403 determines whether an event for mirroring service termination occurs, and upon occurrence of the event, determines whether a context before the occurrence of the event and a context after the occurrence of the event are the same as each other. If the contexts are not the same as each other, the mirroring controller 403 completely terminates a connected mirroring session. On the other hand, if the context after the occurrence of the event is the same as the context before the occurrence of the event, the mirroring controller 403 controls an operation for mirroring mode switching.

That is, the mirroring controller 403 stores the mirroring-related information related to previously connected mirroring in a storing unit 405. The mirroring-related information includes at least one of session information related to connection setting of previously connected mirroring, codec information of a connected counterpart (slave) device, connection device information such as CPU information, and mirroring service information such as application information that is being mirrored.

The mirroring controller 403 also determines whether to perform mirroring connection mode switching with the previously connected slave device, requests a previously connected counterpart (slave) device to reset mirroring in a connection mode by using stored mirroring-related information if determining to perform switching of the mirroring connection mode, and performs mirroring in the connection mode.

As is apparent from the foregoing description, a mirroring service may be seamlessly provided by using mirroring-related information based on a currently connected mirroring connection mode, even if the connection mode is changed.

The invention claimed is:

1. A method for controlling, by a first device, a mirroring service between the first device and a second device, the method comprising:
    establishing a mirroring session with the second device for providing the mirroring service;
    transmitting, to the second device, data for the mirroring service via the established mirroring session;
    if a termination event of the mirroring service occurs, determining whether a vehicle is running and whether the first device is situated in the vehicle;
    if the vehicle is not running or the first device is not situated in the vehicle, terminating the mirroring service and releasing the established mirroring session;
    if the vehicle is running and the vehicle was running before the termination event occurs, and if the first device is situated in the vehicle and the first device was situated in the vehicle before the termination event occurs, storing mirroring-related information;
    after storing the mirroring-related information, determining whether an application corresponding to the data is terminated;
    if it is determined that the application is terminated after storing the mirroring-related information, terminating the mirroring service and releasing the established mirroring session; and
    if it is determined that the application is not terminated after storing the mirroring-related information, re-establishing the mirroring session with the second device for providing the mirroring service based on the stored mirroring-related information, and transmitting, to the second device, the data for the mirroring service via the re-established mirroring session.

2. The method of claim 1, wherein the mirroring-related information comprises at least one of session information related to a setting of the mirroring service, device information related to a mirroring-connected counterpart device, and mirroring service information.

3. A device for controlling a mirroring service between a first device and a second device, the device comprising:
    a transceiver configured to communicate with the second device; and
    at least one processor coupled to the transceiver,
    wherein the at least one processor is configured to:
        establish a mirroring session with the second device for providing the mirroring service;
        transmit, to the second device, data for the mirroring service via the established mirroring session;
        if a termination event of the mirroring service occurs, determine whether a vehicle is running and whether the first device is situated in the vehicle;
        if the vehicle is not running or the first device is not situated in the vehicle, terminate the mirroring service and release the established mirroring session;
        if the vehicle is running and the vehicle was running before the termination event occurs, and if the first device is situated in the vehicle and the first device was situated in the vehicle before the termination event occurs, store mirroring-related information;
        after storing the mirroring-related information, determine whether an application corresponding to the data is terminated;
        if it is determined that the application is terminated after storing the mirroring-related information, terminate the mirroring service and release the established mirroring session; and if it is determined that the application is not terminated after storing the mirroring-related information, re-establish the mirroring session with the second device for providing the mirroring service based on the stored mirroring-related information, and transmit, to the second device, the data for the mirroring service via the re-established mirroring session.

4. The device of claim 3, wherein the mirroring-related information comprises at least one of session information related to a setting of mirroring service, device information related to a mirroring-connected counterpart device, and mirroring service information.

* * * * *